United States Patent
Ito et al.

(10) Patent No.: US 11,891,034 B2
(45) Date of Patent: Feb. 6, 2024

(54) COLLISION AVOIDANCE APPARATUS

(71) Applicant: DENSO CORPORATION, Kariya (JP)

(72) Inventors: Yosuke Ito, Kariya (JP); Kei Kamiya, Kariya (JP); Takaharu Oguri, Kariya (JP); Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 811 days.

(21) Appl. No.: 16/508,717

(22) Filed: Jul. 11, 2019

(65) Prior Publication Data

US 2019/0329745 A1 Oct. 31, 2019

Related U.S. Application Data

(63) Continuation of application No. PCT/JP2018/000307, filed on Jan. 10, 2018.

(30) Foreign Application Priority Data

Jan. 16, 2017 (JP) ................................. 2017-005112

(51) Int. Cl.
  *B60T 7/22* (2006.01)
  *B60T 8/58* (2006.01)
  *G08G 1/16* (2006.01)

(52) U.S. Cl.
  CPC .................. *B60T 7/22* (2013.01); *B60T 8/58* (2013.01); *G08G 1/16* (2013.01); *B60T 2210/30* (2013.01);
  (Continued)

(58) Field of Classification Search
  CPC ... B60R 21/00; B60T 7/22; B60T 8/58; B60T 2210/30; B60T 2250/00; B60T 2250/04;
  (Continued)

(56) References Cited

U.S. PATENT DOCUMENTS

5,926,114 A * 7/1999 Andrews ................ G08G 1/164
                                                340/904
9,308,914 B1 * 4/2016 Sun ........................ B60W 30/16
(Continued)

FOREIGN PATENT DOCUMENTS

JP      2010102641 A      5/2010
JP      2012196997 A   *  10/2012
(Continued)

OTHER PUBLICATIONS

English Translation of JP-2012196997-A.*
English Translation of JP-2017139359-A.*
English Translation of JP-2014090494-A.*

*Primary Examiner* — Geepy Pe
*Assistant Examiner* — Daniel Tyler Reich
(74) *Attorney, Agent, or Firm* — MASCHOFF BRENNAN

(57) ABSTRACT

A collision avoidance apparatus includes a travelling state calculation section, a target detection section, a target state calculation section, a lateral moving object determination section, a collision determination section, and a collision avoidance control section. The collision avoidance control section calculates, based on (i) a passing-through period of the lateral moving object in which the lateral moving object passes through an own vehicle course that is a moving course of the own vehicle and (ii) a reaching time of the own vehicle that is a period remaining before the own vehicle reaching a lateral moving object course that is a moving course of the lateral moving object, an operation timing of the brakes for the lateral moving object passing through the own vehicle course before the own vehicle reaches the lateral moving object course, and operates the brakes at the calculated operation timing of the brakes.

12 Claims, 12 Drawing Sheets

(52) U.S. Cl.
CPC ....... *B60T 2250/00* (2013.01); *B60T 2250/04* (2013.01)

(58) Field of Classification Search
CPC ................ B60W 10/18; B60W 30/09; B60W 30/18159; B60W 2520/10; B60W 2554/4042; B60W 2554/801; B60W 2554/806; G08G 1/16; G08G 1/166
See application file for complete search history.

(56) References Cited

U.S. PATENT DOCUMENTS

| | | | | |
|---|---|---|---|---|
| 9,569,968 | B2 * | 2/2017 | Strauss | B62D 6/001 |
| 2012/0265418 | A1 * | 10/2012 | Foerster | B60W 10/06 |
| | | | | 701/70 |
| 2014/0163859 | A1 * | 6/2014 | Tsuchida | G01S 13/931 |
| | | | | 701/301 |
| 2015/0153737 | A1 * | 6/2015 | Shiota | G05D 1/0289 |
| | | | | 701/96 |
| 2015/0307093 | A1 * | 10/2015 | Sasabuchi | B60W 30/0956 |
| | | | | 701/1 |
| 2016/0114800 | A1 * | 4/2016 | Shimizu | B60W 30/0956 |
| | | | | 701/70 |
| 2016/0335892 | A1 | 11/2016 | Okada et al. | |
| 2016/0375882 | A1 * | 12/2016 | Trapp | B60T 8/17616 |
| | | | | 701/74 |
| 2017/0064175 | A1 * | 3/2017 | Furutake | G06V 20/58 |
| 2017/0158127 | A1 * | 6/2017 | Akiyama | B60Q 9/008 |
| 2018/0178782 | A1 * | 6/2018 | Saiki | B60W 30/09 |

FOREIGN PATENT DOCUMENTS

| | | | |
|---|---|---|---|
| JP | 2014090494 A | * | 5/2014 |
| JP | 2015170233 A | | 9/2015 |
| JP | 2017139359 A | * | 8/2017 |

* cited by examiner

STORAGE SECTION

292

| REFLECTION INTENSITY | ESTIMATION LENGTH |
|---|---|
| HIGH | FIRST LENGTH |
| LOW | SECOND LENGTH |

294

| No. | PREDETERMINED DECELERATION |
|---|---|
| 1 | FIRST DECELERATION |
| 2 | SECOND DECELERATION |

COLLISION AVOIDANCE APPARATUS

CROSS REFERENCE TO RELATED APPLICATION

The present application claims the benefit of priority from earlier Japanese Patent Application No. 2017-005112 filed on Jan. 16, 2017, the entire description of which is incorporated herein by reference.

BACKGROUND

The present disclosure relates to technique for avoiding a collision between an own vehicle and a lateral moving object.

A collision avoidance apparatus detects a target ahead of an own vehicle. In a case where the detected target is a lateral moving object that is moving in a direction orthogonal/perpendicular to a traveling direction of the own vehicle, the collision avoidance apparatus automatically operates brakes of the own vehicle when time to collision is less than a predetermined threshold.

SUMMARY

The present disclosure provides a collision avoidance apparatus. The collision avoidance apparatus of the present disclosure detects a target ahead of an own vehicle, and calculates a state of the detected target. If the detected target is a lateral moving object that is moving a direction in a direction orthogonal/perpendicular to a traveling direction of the own vehicle and the collision avoidance apparatus has determined that the own vehicle will collide with the lateral moving object, the collision avoidance apparatus automatically controls brakes of the own vehicle. The collision avoidance apparatus calculates, based on (i) a passing-through period of the lateral moving object in which the lateral moving object passes through an own vehicle course that is a moving course of the own vehicle and (ii) a reaching period of the own vehicle that is a period remaining before the own vehicle reaching a lateral moving object course that is a moving course of the lateral moving object, an operation timing of the brakes for the lateral moving object passing through the own vehicle course before the own vehicle reaches the lateral moving object course, an operation timing of the brakes for the lateral moving object passing through the own vehicle course before the own vehicle reaches the lateral moving object course, and operates the brakes when the calculated operation timing arrives.

BRIEF DESCRIPTION OF THE DRAWINGS

The aim set forth above and other aims, or characteristics or advantageous effects of the present disclosure will be clarified more through the specific description given below referring to the accompanying drawings. In the drawings:

FIG. 8 is a block diagram of a storage section in a third embodiment;

DETAILED DESCRIPTION OF THE PREFERRED EMBODIMENTS

Figure 1:
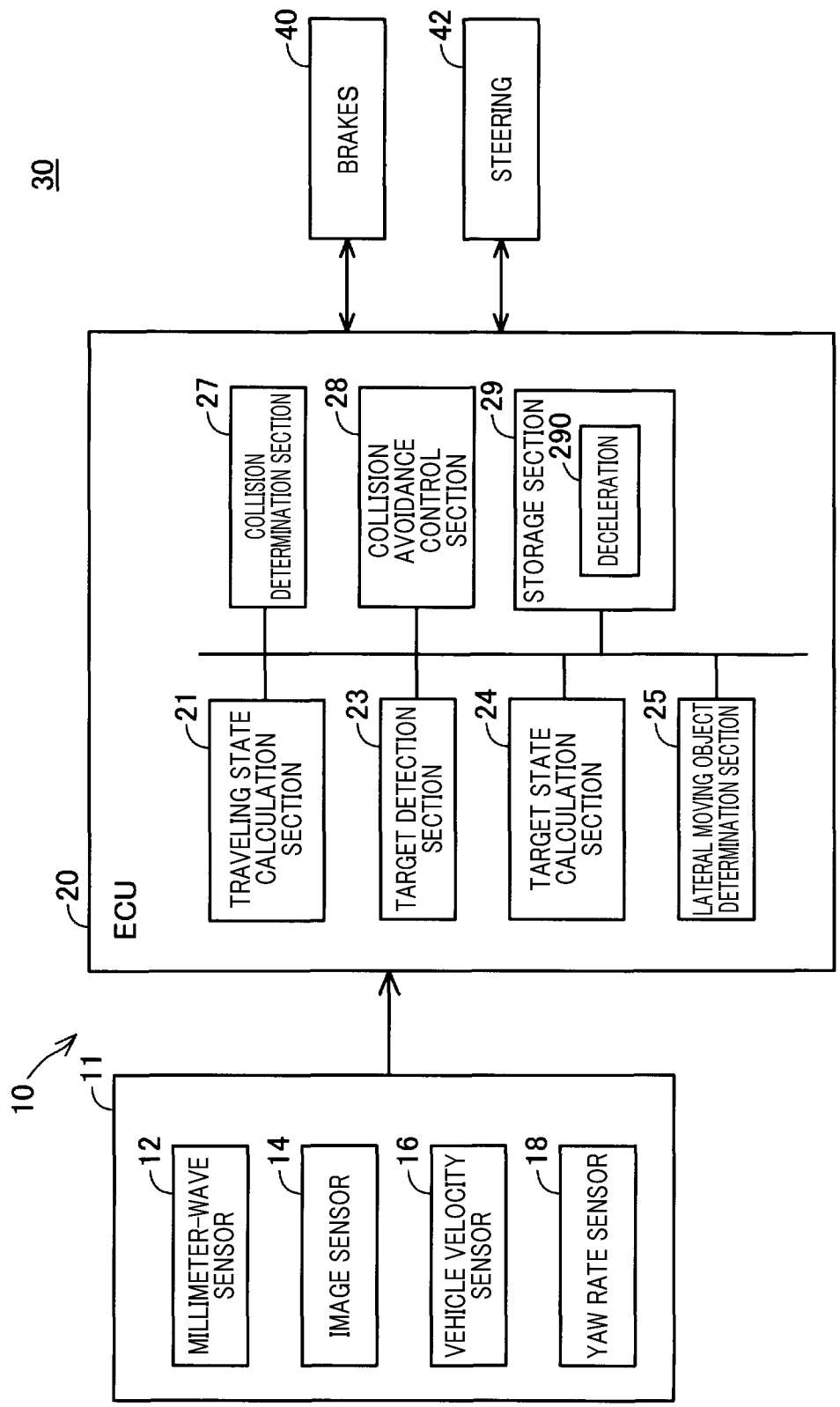
FIG. 1 is a block diagram of a collision avoidance system which includes a collision avoidance apparatus in a first embodiment.

As described JP-2010-102641 A, a collision avoidance apparatus detects a target ahead of an own vehicle, and in a case where the detected target is a lateral moving object that is moving in a direction orthogonal/perpendicular to a traveling direction of the own vehicle, automatically operates brakes of the own vehicle when time to collision is less than a predetermined threshold.

Described in JP-2010-102641 A, there is a case in the collision avoidance apparatus described in JP-2010-102641 A where the brakes are automatically operated at an unduly early timing, in order to avoid a collision between an own vehicle and a lateral moving object. Therefore, a technique in a collision avoidance apparatus is desired which automatically operates the brakes at an appropriate timing.

Techniques of the present disclosure relate to providing a collision avoidance apparatus is capable of operating the brakes at an appropriate timing.

A collision avoidance apparatus, which is one aspect of technique of the present disclosure, includes a travelling state calculation section, a target detection section, a target state calculation section, a lateral moving object determination section, a collision determination section, and a collision avoidance control section. The travelling state calculation section calculates a travelling state which includes a moving direction and a moving velocity of an own vehicle. The target detection section detects a target ahead of the own vehicle. The target state calculation section calculates a state of the target detected by the target detection section which includes a moving direction of the target, a size of the target, a moving velocity of the target, and a position of the target relative to a position of the own vehicle. The lateral moving object determination section determines whether the target is a lateral moving object moving in a direction orthogonal to the moving direction of the own vehicle. The collision determination section determines whether the own vehicle will collide with the lateral moving object if the lateral moving object determination section has determined that the target is a lateral moving object. The collision avoidance control section automatically controls the brakes of the own vehicle such that a velocity of the own vehicle is to be a predetermined deceleration if the collision determination section has determined that the own vehicle will collide with the lateral moving object. Further, the collision avoidance control section calculates, based on (i) a passing-through period of the lateral moving object in which the lateral moving object passes through an own vehicle course that is a moving course of the own vehicle and (ii) a reaching period of the own vehicle that is a period remaining before the own vehicle reaching a lateral moving object course that is a moving course of the lateral moving object, an operation timing of the brakes for the lateral moving object passing through the own vehicle course before the own vehicle reaches the lateral moving object course, and operates the brakes when the calculated operation timing arrives.

With this configuration, the collision avoidance apparatus calculates the operation timing of brakes based on the passing-through period of the lateral moving object and the reaching period of the own vehicle and operates the brakes when the calculated operation timing arrives. Therefore, since the collision avoidance apparatus is capable of suppressing the brakes from being automatically operated at an unduly early timing, the collision avoidance apparatus can operate the brakes at an appropriate timing.

A. First Embodiment

Figure 2:
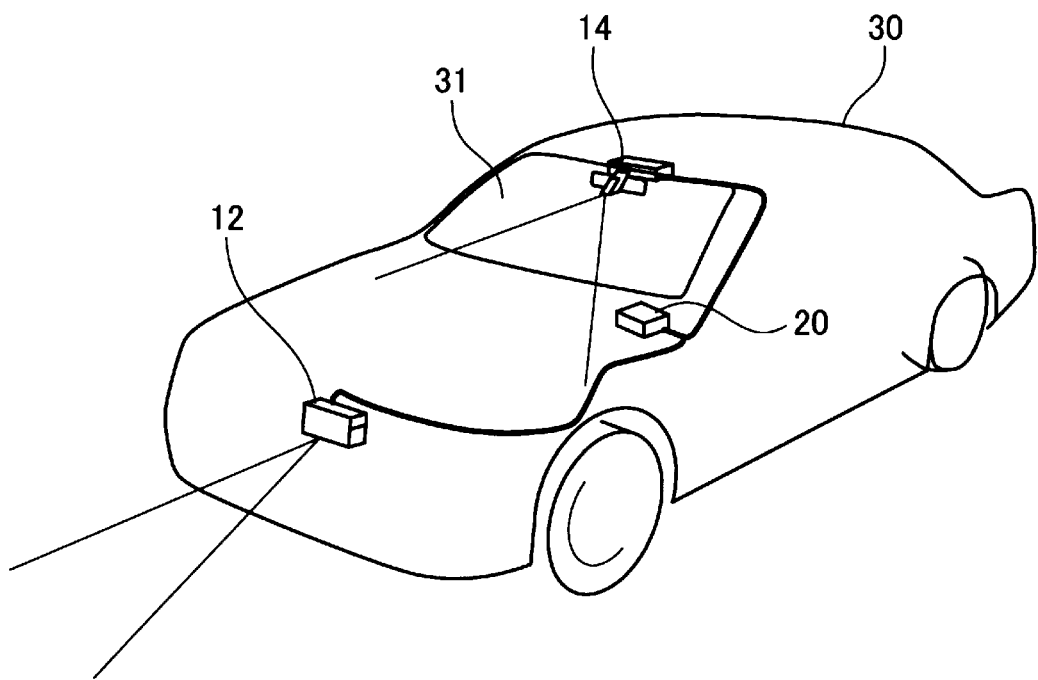
FIG. 2 is a diagram illustrating a vehicle which includes the collision avoidance system.

Referring to FIGS. 1 and 2, a description will be given of a collision avoidance system 10. The collision avoidance system 10 mounted to an own vehicle 30 includes a sensor section 11 and an ECU 20 as a collision avoidance apparatus. The sensor section 11 and the ECU 20 are connected to each other via an intercommunication network.

The sensor section 11 includes a millimeter-wave sensor 12, an image sensor 14, a vehicle velocity sensor 16 and a yaw rate sensor 18. As shown in FIG. 2, the millimeter-wave sensor 12 is mounted to a front portion of the own vehicle 30. The millimeter wave sensor 12 is configured as a "millimeter wave radar" in an FMCW system. The millimeter-wave sensor 12 transmits and receives radar waves in a millimeter-wave range such that the frequency is modulated. A range in which the millimeter wave sensor 12 transmits a millimeter-wave, is a range which is capable of including a target present ahead of the own vehicle 30 (for example, another vehicle, a pedestrian and a bicycle). The area ahead of the own vehicle 30 includes ahead of the own vehicle 30 on the right and ahead of the own vehicle 30 on the left, in addition to directly ahead of the own vehicle 30.

As shown in FIG. 2, the image sensor 14 is mounted to near the upper side of a front shield 31. The image sensor 14 is a camera including a well-known configuration. The image sensor 14 is capable of capturing a scene ahead of the own vehicle 30. An imaging range of the image sensor 14 is a range in which is capable of including a target present ahead of the own vehicle 30.

The vehicle velocity sensor 16 (FIG. 1) acquires data of a moving velocity of the own vehicle 30. The yaw rate sensor 18 acquires data of a rotation angular velocity of the own vehicle 30. Various data which are acquired by the sensor section 11, are transmitted to the ECU 20.

The ECU 20 includes a storage section 29 and CPU (not shown). As described below in detail, a collision avoidance process is implemented by the ECU 20 by executing a control program stored in the storage section 29. The storage section 29 includes a configuration, such as ROM and RAM. FIG. 1 functionally shows a control program executed by the CPU. The ECU 20 is connected to brakes 40 and a steering apparatus 42 which are mounted to the own vehicle 30 via the intercommunication network. Furthermore, the storage section 29 stores information related to the own vehicle 30 such as length of the own vehicle 30 and width of the own vehicle 30, and preset deceleration 290. The deceleration 290 is used by a collision avoidance control section 28 described following in detail.

The ECU 20, as a program which is executed by the CPU, includes a travelling state calculation section 21, a target detection section 23, a target state calculation section 24, a lateral moving object determination section 25, a collision determination section 27 and the collision avoidance control section 28.

The travelling state calculation section 21 calculates a traveling state which includes a moving direction of the own vehicle 30 and the moving velocity of the own vehicle 30. The moving direction of the own vehicle 30 is a moving direction of the own vehicle 30 (own vehicle moving direction) relative to stationary objects (road surface), and can be calculated by well-known method.

The target detection section 23 detects a target present ahead of the own vehicle 30, based on reflected waves which are radar waves acquired by the millimeter-wave sensor 12. It is noted that, the target detection section 23 may detect the target present ahead of the own vehicle 30, based on such as a captured image which is data acquired by the image sensor 14 or both of data of the captured image and the reflected waves.

The target state calculation section 24 calculates a state of the target which has been detected by the target detection section 23, based on data acquired from the millimeter-wave sensor 12 and the image sensor 14. The state of the target includes a moving direction of the target, a size of the target, a moving velocity of the target, and a position of the target relative to a position of the own vehicle 30. The target state calculation section 24 calculates a relative moving direction of the target relative to the own vehicle 30. Then, the target state calculation section 24 calculates a moving direction (hereinafter referred to as a target moving direction) of the target relative to stationary objects using the own vehicle moving direction and the relative moving direction of the target. The size of the target includes at least a length (hereinafter referred to as a target length) along to the target moving direction and a length (hereinafter referred to as target width) along to a direction orthogonal to the target moving direction a vertical direction. It is noted that, the target width may be set to a predicted maximum width among targets which are predicted to move on a road, in advance, as a calculation value. For example, the maximum width may be the maximum width of a vehicle which can travel on the road.

The lateral moving object determination section 25 determines whether the target is a lateral moving object which moves in a direction orthogonal to the moving direction of the own vehicle 30. Specifically, the lateral moving object determination section 25 determines that the target is the lateral moving object when an angle between the own vehicle moving direction and the target moving direction is 90° or about 90°.

The collision determination section 27 determines whether the own vehicle 30 will collide with the lateral moving object if the lateral moving object determination section 25 has determined that the target is the lateral moving object. The determination by the collision determination section 27 will be described later.

The collision avoidance control section 28 automatically controls the brakes 40 such that a velocity of the own vehicle 30 is to change with a predetermined deceleration set in the storage section 29, if the collision determination section 27 has determined that the own vehicle 30 will collide with the lateral moving object. Furthermore, the collision avoidance control section 28 calculates an operation timing of the brakes 40 for which the lateral moving object passes through an own vehicle course before the own vehicle 30 arrives at the lateral moving course. The own vehicle course is a moving course of the own vehicle 30. The lateral moving course is a moving course of the lateral moving object. In addition, the collision avoidance control section 28 operates the brakes when the calculated operation timing arrives. A calculation method of the operation timing will be described latter.

Referring to FIGS. 3 to 6, the collision avoidance process which is implemented by the collision avoidance system 10 in the first embodiment will be described. By a period in which the brakes 40 are automatically operated, the collision avoidance process is repeatedly implemented in a predetermined cycle. In FIGS. 3 to 6, an example will be described in which a vehicle 35 (FIG. 4) moves along a first road 52 among the first and a second roads 52 and 51, and the own vehicle 30 moves along the second road 51. The vehicle 35 is example of a lateral moving object 35. The first and second roads 52 and 51 are orthogonal to each other. It is noted that, the lateral moving object 35 is not limited a vehicle. The lateral moving object 35 may be the other object which moves in a direction orthogonal to the moving direction of the own vehicle 30, for example, a bicycle or a pedestrian. Furthermore, in FIG. 6, a vertical axis illustrates a distance Da from a front end 30f of the own vehicle 30 to a lateral moving object course 37 and a horizontal axis illustrates an elapsed time t. In addition, in FIG. 6, solid lines illustrate a relationship between the distance Da and the elapsed time t when the brakes 40 are not automatically operated. Dotted lines illustrate a relationship between the distance Da and the elapsed time t when the brakes 40 are automatically operated.

Figure 3:
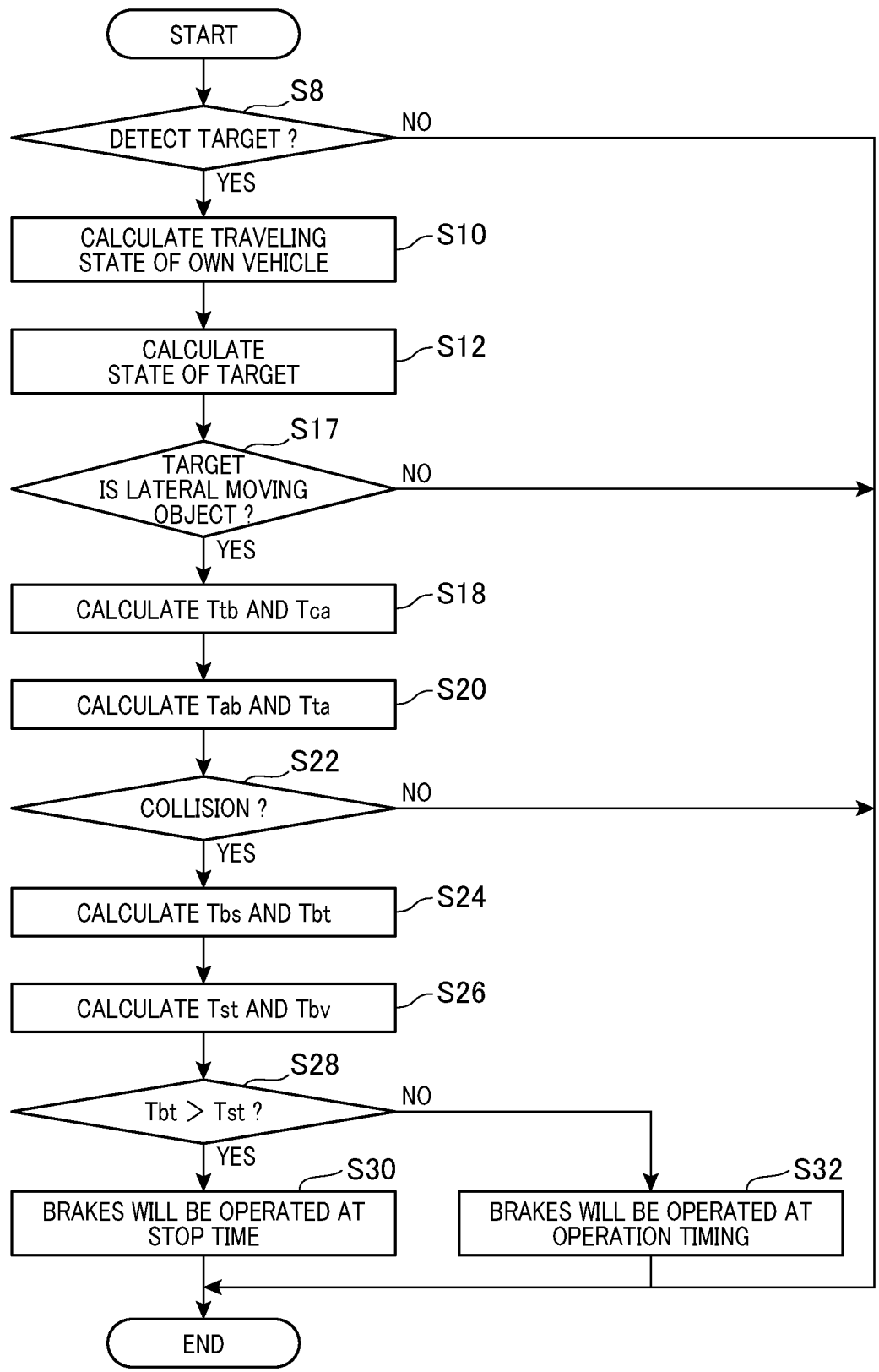
FIG. 3 is a flowchart of a collision avoidance process which is implemented by the collision avoidance system.

As shown in FIG. 3, the target detection section 23 detects a target located ahead of the own vehicle 30 (step S8). If the target detection section 23 has not detected the target, the collision avoidance process is terminated, and step S8 is executed after a predetermined time has been elapsed. If the determination result of step S8 is YES, the travelling state calculation section 21 calculates the traveling state of the own vehicle 30 (step S10). The target state calculation section 24 calculates the state of the target (step S12).

Next, the lateral moving object determination section 25 determines whether the target is a lateral moving object 35 (step S17). If the lateral moving object determination section 25 has determined that the target is not a lateral moving object 35 (NO at step S17), the collision avoidance process is terminated. If the lateral moving object determination section 25 has determined that the target is a lateral moving object 35 (YES at step S17), the collision determination section 27 executes a collision determination process to determine whether the own vehicle 30 will collide with the lateral moving object 35.

Figure 4:
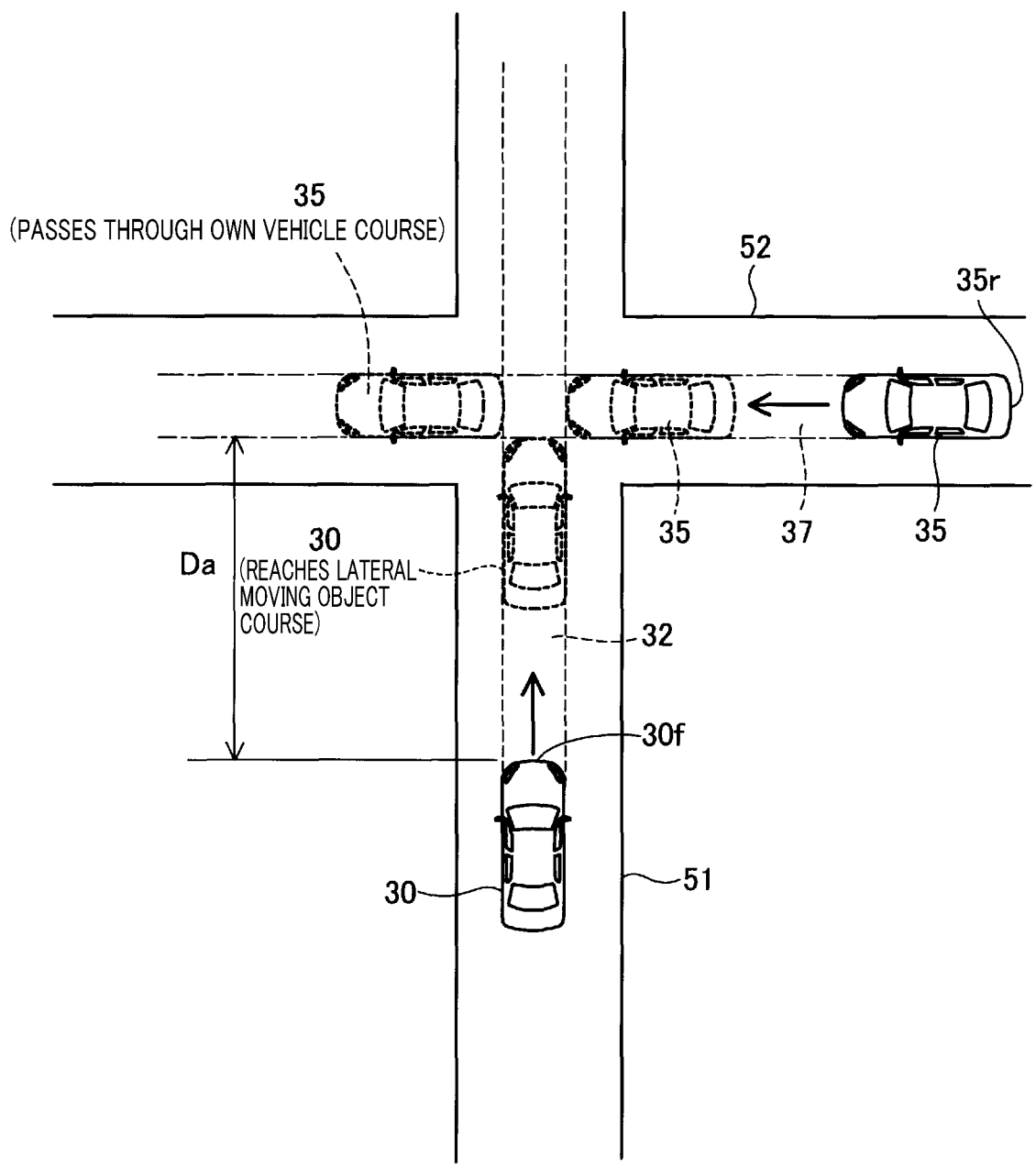
FIG. 4 is a diagram for illustrating a passing-through period of a lateral moving object and a reaching period of an own vehicle.

Specifically, the collision determination section 27 calculates a passing-through period Ttb of the lateral moving object and a reaching period Tca of the own vehicle using calculation results of step S10 and step S12 (step S18). The passing-through period Ttb of the lateral moving object is a period elapsing from the present time to when the lateral moving object 35 passes through an own vehicle course 32. The own vehicle course 32 is a moving course of the own vehicle 30. That is, as shown in FIG. 4, the passing-through period Ttb of the lateral moving object is a period from the present time to when a rear end 35r of the lateral moving object 35 passes through the own vehicle course 32. As shown in FIG. 4, the reaching period Tca of the own vehicle is a period elapsing from a present time in which the own vehicle 30 is illustrated by solid lines to when the own vehicle 30 reaches a position where the own vehicle 30 is illustrated by dotted lines. In other words, the reaching period Tca of the own vehicle is a period elapsing from the present time in which the own vehicle 30 is illustrated by solid lines to when the own vehicle 30 reaches the lateral moving object course 37. The lateral moving object course 37 is a moving course of the lateral moving object 35. That is, the reaching period Tca of the own vehicle is a period elapsing from the present time to when the front end 30f of the own vehicle 30 reaches the lateral moving object course 37.

Figure 5:
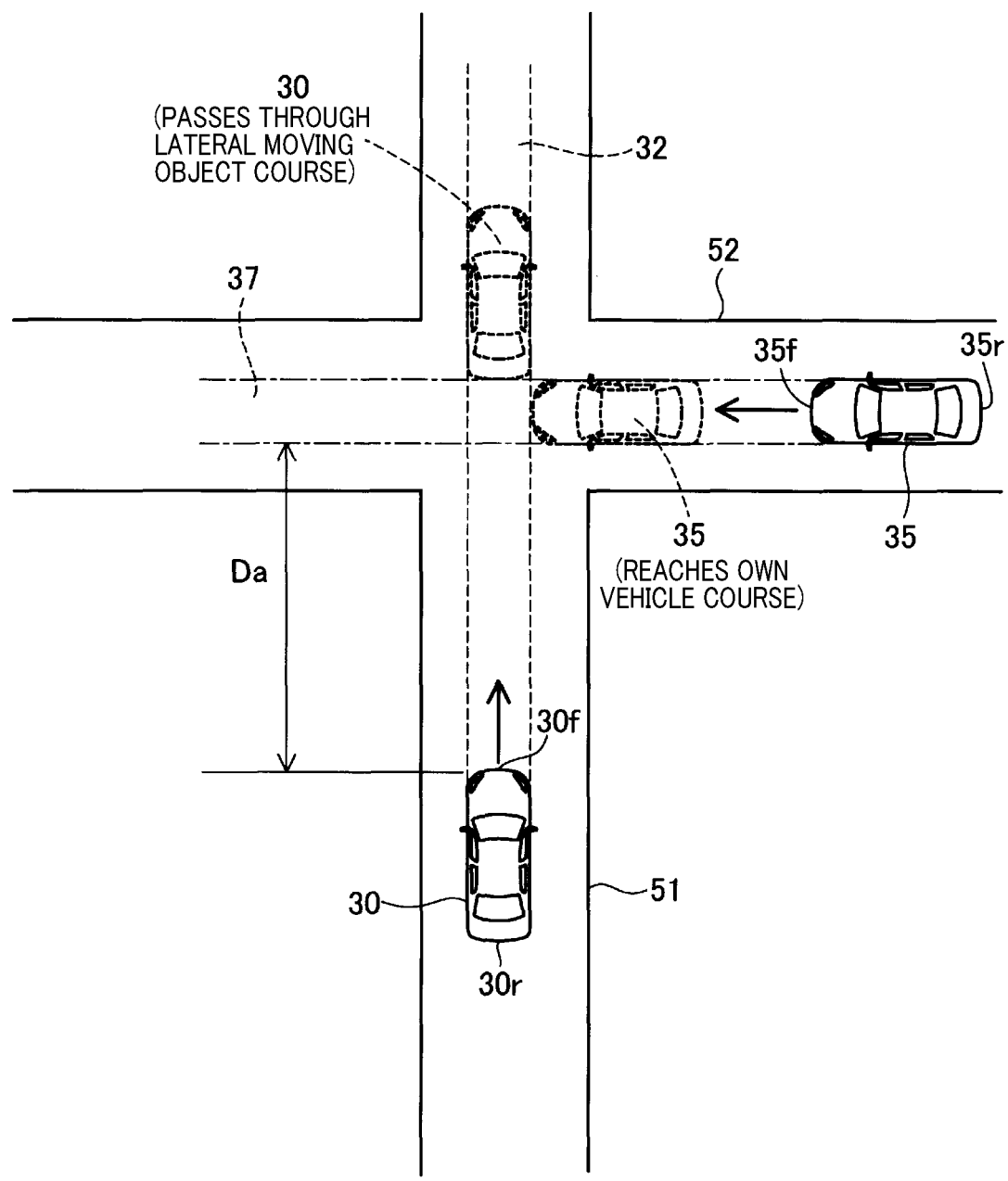
FIG. 5 is a diagram for illustrating a passing-through period of the own vehicle and a reaching period of the lateral moving object.

The collision determined section 27 calculates a reaching period Tab of the lateral moving object and a passing-through period Tta of the own vehicle using calculation results in step S10 and step S12 (step S20). As shown in FIG. 5, the reaching period Tab of the lateral moving object is a period elapsing from the present time where the lateral moving object 35 is illustrated by solid lines to when the lateral moving object 35 reaches a position where the lateral moving object 35 is illustrated by dotted lines. That is, the reaching period Tab of the lateral moving object is a period elapsing from the present time where the lateral moving object 35 is illustrated by solid lines to when the lateral moving object 35 reaches the own vehicle course 32. In other words, the reaching period Tab of the lateral moving object is a period elapsing from the present time to when a front end 35f of the lateral moving object 35 reaches the own vehicle course 32. As shown in FIG. 5, the passing-through period Tta of the own vehicle is a period elapsing from the present time where the own vehicle 30 is illustrated by solid lines to when the own vehicle 30 passes through a position where the own vehicle 30 is illustrated by dotted lines. That is, the passing-through period Tta of the own vehicle is a period elapsing from the present time where the own vehicle 30 is illustrated by solid lines to when the own vehicle 30 passes through the lateral moving object course 37. In other words, the passing-through period Tta of the own vehicle is a period elapsing from the present time to when a rear end 30r of the own vehicle 30 passes through the lateral moving object course 37.

Next, the collision determination section 27 determines whether the own vehicle 30 will collide with the lateral moving object 35 using each of periods which are calculated in step S18 and step S20 (step S22). Specifically, the collision determination section 27 determines that the own vehicle 30 will collide with the lateral moving object 35 if both of conditions (a) and (b) are not satisfied. The collision determination section 27 determines that the own vehicle 30 will not collide with the lateral moving object 35 if at least one of the conditions (a) and (b) is satisfied.

<Conditions>

(a) The passing-through period Tta of the own vehicle is less than or equal to the reaching period Tab of the lateral moving object.

(b) The passing-through period Ttb of the lateral moving object is less than or equal to the reaching period Tca of the own vehicle.

Figure 6:
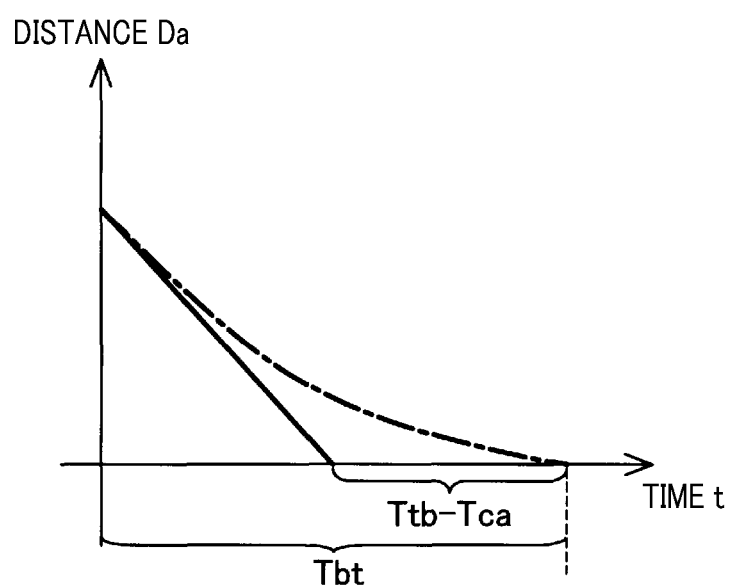
FIG. 6 is a diagram illustrating a relationship between a distance from the own vehicle to the lateral moving object course and an elapsed time.

In step S22, if the collision determination section 27 has determined that the own vehicle 30 will not collide with the lateral moving object 35 (No at step S22), the collision avoidance process is terminated, and the step S8 is executed after a predetermined time has been elapsed. In step S22, the collision determination section 27 has determined that the own vehicle 30 will collide with the lateral moving object 35 (YES at step S22), the collision avoidance control section 28 calculates an operation timing Tbs of the brakes 40 and an operation period Tbt of the brakes 40, in order to avoid collision between the own vehicle 30 and the lateral moving object 35 (step S24). The operation timing Tbs and the operation period Tbt are calculated based on the passing-through period Ttb of the lateral moving object and the reaching period Tca of the own vehicle. As shown in FIG. 6, in the present embodiment, the operation period Tbt is calculated using the following equation such that the passing-through period Ttb of the lateral moving object is the same period as the reaching period Tca of the own vehicle. In an equation (1), since components except the operation period Tbt can be acquired, the operation period Tbt can be calculated.

$$V_{30} \times Tbt + \{(VD \times Tbt^2)/2\} = V_{30} \times \{Tbt - (Ttb - Tca)\} \quad (1)$$

In the equation (1), $V_{30}$ is the moving velocity of the own vehicle 30, and VD is the predetermined deceleration stored in the storage section 29.

The operation timing Tbs is a first threshold of a time to collision TTC when a relative distance between the own vehicle 30 and the lateral moving object 35 is to be 0. That is, when the time to collision TTC has arrived the first threshold (the operation timing Tbs) which is calculated by an equation (2), the collision avoidance control section 28 automatically operates the brakes 40. The collision avoidance control section 28 calculates the time to collision TTC using an equation (3) in a predetermined cycle.

$$Tbs = [V_{30} \times Tbt + \{(VD \times Tbt^2)/2\}]/V_{30} \quad (2)$$

$$TTC = Da/V_{30} \quad (3)$$

The collision avoidance section 28 calculates an own vehicle stop period Tst and a stop time Tbv. The own vehicle stop period Tst is a period from when the collision avoidance control section 28 has operated the brakes 40 to when the own vehicle 30 stops, if the brakes 40 are operated based on the predetermined deceleration stored in the storage section 29, at the time when the collision determination section 27 has determined that the own vehicle 30 will collide with the lateral moving object 35. The own vehicle stop period Tst can be calculated by an equation (4).

$$V_{30} + VD \times Tst = 0 \quad (4)$$

The stop time Tbv is a time in which the brakes 40 are operated such that the own vehicle 30 stops in front of the lateral moving object 37. The stop time Thy is a second threshold of the time to collision TTC. That is, when the time to collision TTC has arrived the second threshold (the stop time Tbv), the collision avoidance control section 28 operates the brakes 40. The collision avoidance section 28 calculates the stop time Tbv using an equation (5).

$$Tbv = [V_{30} \times Tst + \{(VD \times Tst^2)/2\}]/V_{30} \quad (5)$$

Next, the collision avoidance control section 28 determines whether the operation period Tbt is longer than the own vehicle stop period Tst (step S28). If the collision avoidance control section 28 has determined that the operation period Tbt is longer than the own vehicle stop period Tst (YES at step S28), the collision avoidance control section 28 operates the brakes 40 at the stop time Tbv, regardless of whether the operation timing Tbs has arrived (step S30). Accordingly, the own vehicle 30 will stop in front of the lateral moving object 35.

If the collision avoidance control section 28 has determined that the operation period Tbt is less than or equal to the own vehicle stop period Tst (NO at step S28), the collision avoidance control section 28 will operate the brakes 40 at the operation timing Tbs (step S32). Therefore, the lateral moving object 35 can pass through the own vehicle course 32 before the own vehicle 30 reaches the lateral moving object course 37.

With the first embodiment, the collision avoidance control section 28 calculates the operation timing Tbs of the brakes 40 based on the passing-through period Ttb of the lateral moving object and the reaching period Tca of the own vehicle, and automatically operates the brakes 40 at the calculated operation timing Tbs of the brakes 40 (steps S24 and S32 in FIG. 3). Therefore, it is capable of suppressing the brakes from being automatically operated unduly early, and instead operating the brakes at an appropriate timing. Specifically, in the first embodiment, the collision avoidance control section 28 calculates the operation timing Tbs such that the passing-through period Ttb of the lateral moving object is the same period as the reaching period Tca of the own vehicle. Therefore, it is capable of better suppressing the brakes from being automatically operated unduly early, and instead operating the brakes at an appropriate timing. Furthermore, according to the first embodiment, if the operation period Tbt is longer than the own vehicle stop period Tst, the collision avoidance control section 28 automatically operates the brakes 40 at the stop time Thy regardless of whether the operation timing Tbs has arrived (step S30 in FIG. 3). Accordingly, it is capable of better suppressing the brakes 40 from being automatically operated at an unduly early timing.

In addition, according to the first embodiment, the collision determination section 27 determines that the own vehicle 30 will collide with the lateral moving object 35 if all of following conditions are not satisfied, a first condition that the passing-through period Tta of the own vehicle is less than or equal to the reaching period Tab of the lateral moving object, and a second condition that the passing-through period Ttb of the lateral moving object is less than or equal to the reaching period Tca of the own vehicle (step S22 in FIG. 3). Therefore, if a probability is low that the own vehicle 30 will collide with the lateral moving object 35, it is capable of suppressing the brakes 40 from being automatically operated.

B. Second Embodiment

Figure 7:
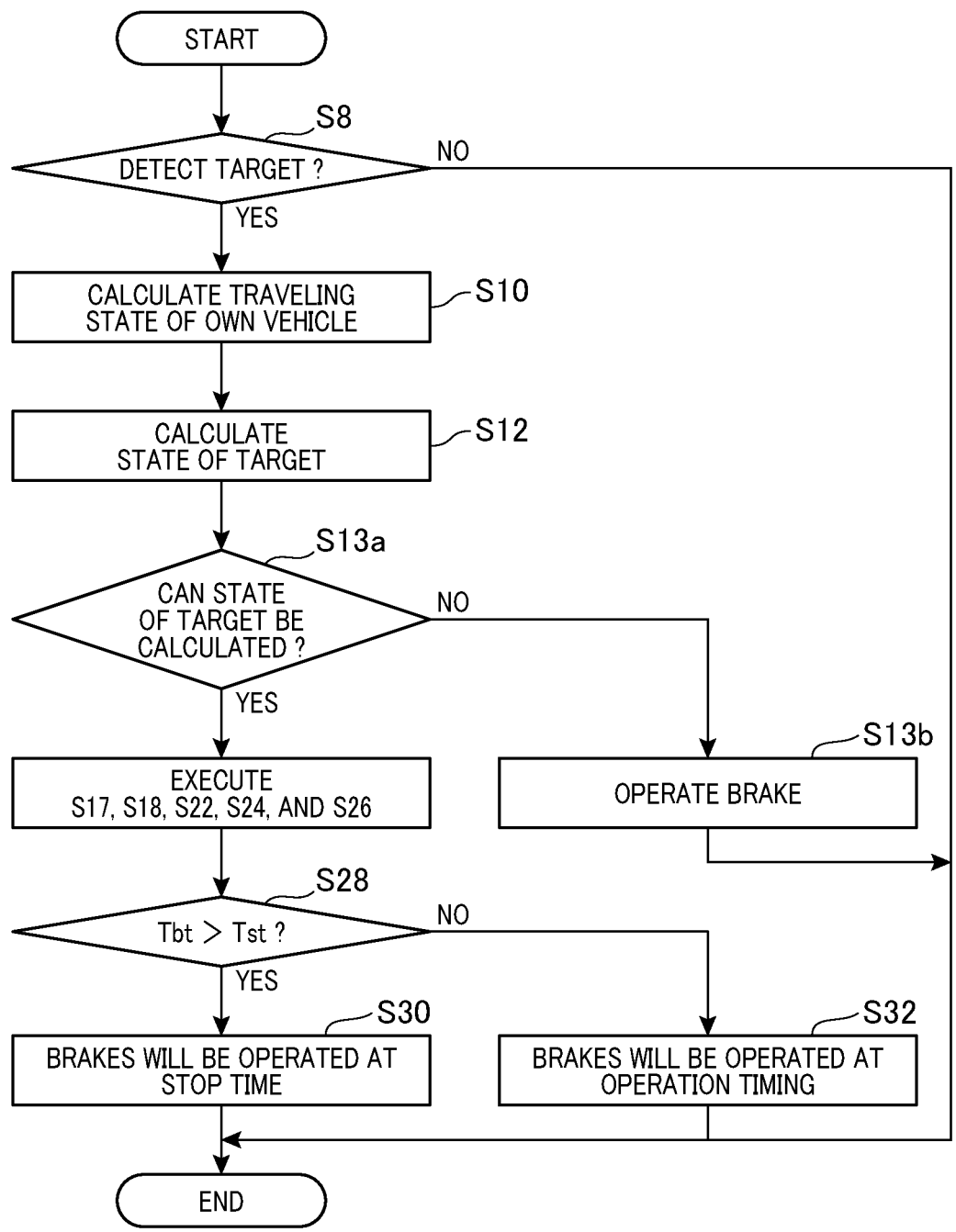
FIG. 7 is a flowchart of a collision avoidance process in a second embodiment.

Referring to FIG. 7, below is a description of a collision avoidance process in a second embodiment which is implemented by the collision avoidance system 10. The collision avoidance process in the second embodiment is different from that according to the first embodiment in additional steps S13a and S13b in the collision avoidance process. Accordingly, the following description deals with processing different from that of the first embodiment. Identical processes are denoted by the same reference signs, and the description thereof is omitted.

After step S12, the collision avoidance control section 28 determines whether the target state calculation section 24 can calculate the state of the target (step S13a). There is a case where the target state calculation section 24 cannot calculate the state of the target in a stable manner, for example, the size of the target or the moving velocity of the target, based on data acquired from the millimeter-wave sensor 12 and the image sensor 14, such as by there being an obstacle between the own vehicle 30 and the target or the presence of rain.

If the collision avoidance control section 28 has determined a calculation disabled state in which the target calculation section 24 cannot calculate the state of the target (No at step S13a), the collision avoidance control section 28 operates the brakes 40 from when the collision avoidance control section 28 has determined the calculation disabled state, regardless of whether the operation timing Tbs arrives (step S13b).

The collision avoidance process in the second embodiment above in detail yields advantageous effects as follows, in addition to an effect yielded in the collision avoidance process in the first embodiment. That is, the collision avoidance control section 28 operates the brakes 40 when the collision avoidance control section 28 has determined the calculation disabled state. Due to this, it is capable of better reducing a probability of the own vehicle 30 colliding with the target.

C. Third Embodiment

Figure 9:
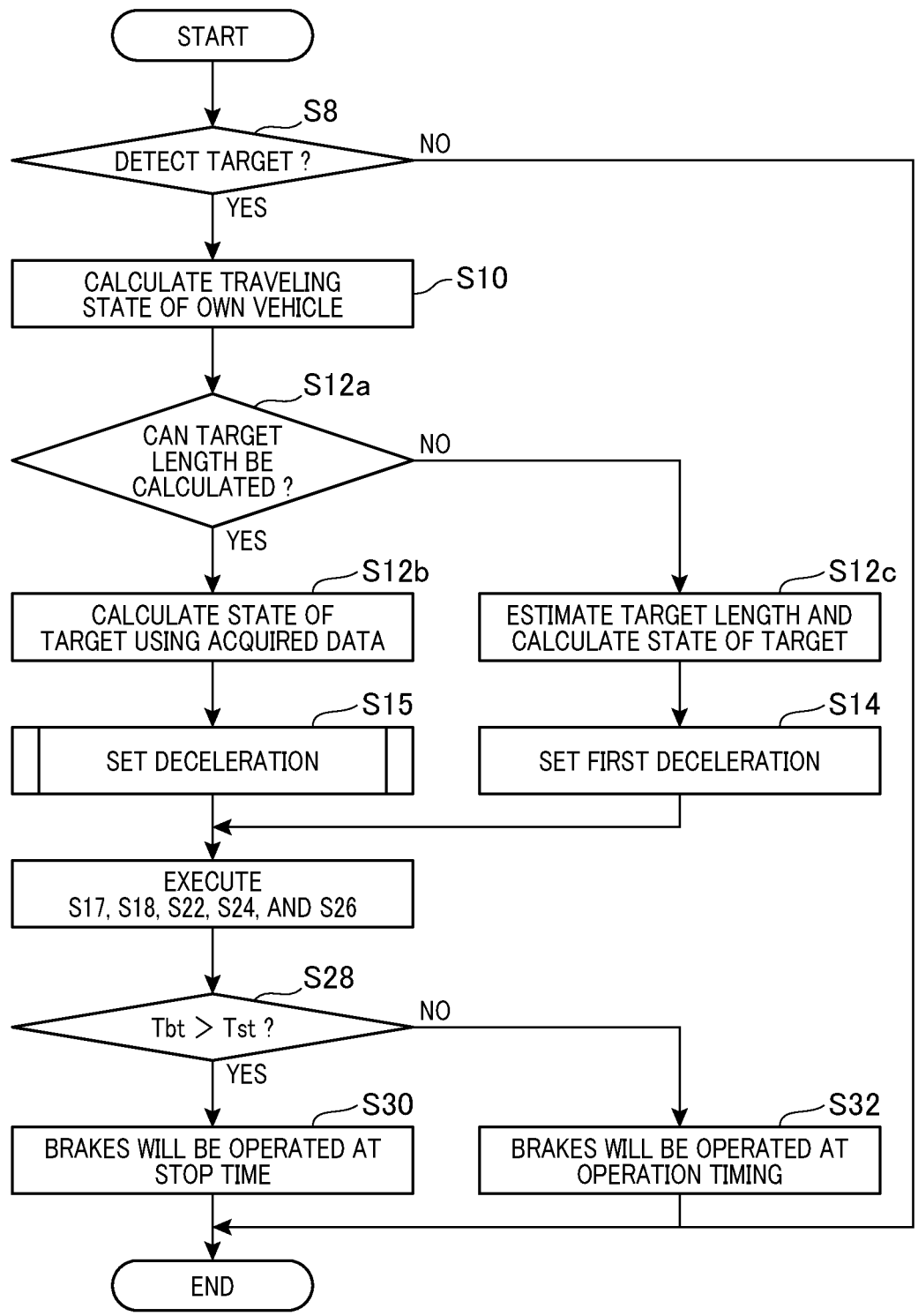
FIG. 9 is a flowchart of a collision avoidance process in a third embodiment.
Figure 10:
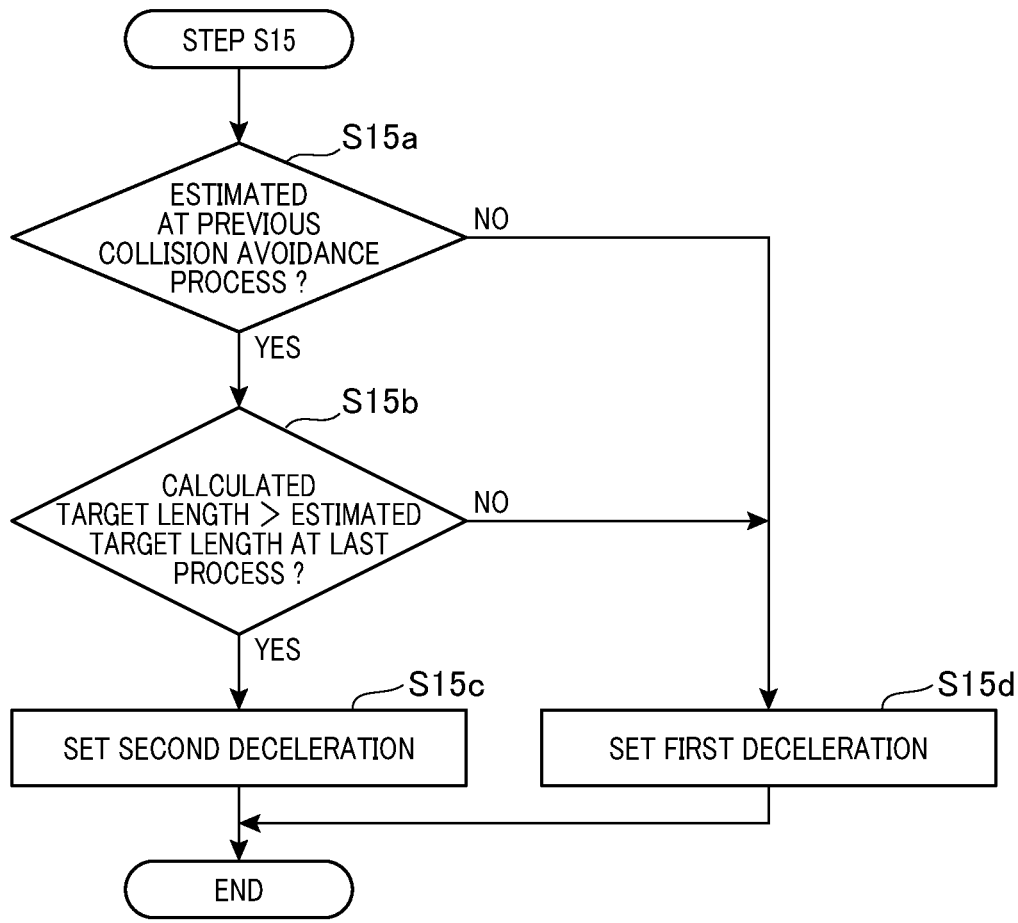
FIG. 10 is a flowchart of a setting deceleration process.

Referring to FIGS. 8 to 10, a description will be given of a collision avoidance process in a third embodiment which is implemented by the collision avoidance system 10. Note that the following description deals with processing different from that of the first embodiment. In FIGS. 9 and 10, identical processes are denoted by the same reference signs, and description thereof is omitted. In the third embodiment, the storage section 29 of the ECU 20 stores an estimation table of length 292 and a table of deceleration 294 instead of the predetermined deceleration 290.

The estimation table of length 292 (FIG. 8) defines a relationship between reflection intensity of the reflected waves (dB) and an estimated length of the target along the moving direction of the target. The target state calculation section 24 estimates the target length based on the estimation table of length 292 and the reflection intensity of the reflected waves acquired from the millimeter-wave sensor 12. Specifically, if the reflection intensity of the reflected waves is high, the target length is estimated to be a first length. If the reflection intensity of the reflected waves is low, the target length is estimated to be a second length. The second length is shorter than the first length. The first length is set to a value that is assumed in a case where the target is a vehicle. The second length is set to a value that is assumed in a case where the target is a pedestrian.

The target state calculation section determines that the reflection intensity of the reflected waves is high, if a measurement value of the reflection intensity of the reflected waves acquired from the millimeter-wave sensor 12 is greater or equal to a predetermined threshold. The target state calculation section determines that the reflection intensity of the reflected waves is low, if the measurement value of the reflection intensity of the reflected waves acquired from the millimeter-wave sensor 12 is less than the predetermined threshold. It is noted that, determination method is not limited described above. For example, if the measurement value of the reflection intensity of the reflected waves acquired from the millimeter-wave sensor 12 belongs to a first range, the reflection intensity of the reflected waves may be determined to be high. If the measurement value of the reflection intensity of the reflected waves acquired from the millimeter-wave sensor 12 belongs to a second range, the reflection intensity of the reflected waves may be determined to be low. Values belonging to the second range are less than values belonging to the first range. As described above, the second length which is estimated by the target state calculation section 24 when the reflection intensity of the reflected waves is a second value is shorter than the first length which is estimated by the target state calculation section 24 when the reflection intensity of the reflected waves is a first value. The second value is less than the first value.

The deceleration table 294 stores two deceleration which are different from each other. The first deceleration is a deceleration which is used in a case where the target state calculation section 24 estimates the target length by referring to the length estimation table 292. The second deceleration is a deceleration which is used in a case where the target state calculation section 24 can calculate the target length after the target state calculation section 24 has estimated the target length and the calculated target length is longer than the estimated target length. The second deceleration is set such that the second deceleration is greater than the first deceleration. For example, the second deceleration is set to be $-8$ (m/s$^2$) and the first deceleration is set to be $-4$ (m/s$^2$).

As shown in FIG. 9, if the target state calculation section 24 cannot calculate the target length based on data acquired from the millimeter-wave sensor 12 and the image sensor 14 after step S10 is executed (NO at step S12a), step S12c is executed. A case of where the target length cannot be calculated, for example, is a case where the target has only been partially captured in the captured image due to a part of the target being located outside the imaging area of the image sensor 14. In step S12c, the target state calculation section 24 estimates the target length based on the reflected waves acquired from the millimeter-wave sensor 12 and calculates the state of the target. Specifically, the target state calculation section 24 estimates the target length using the reflection intensity of the reflected waves acquired from the millimeter-wave sensor 12 and the length estimation table 292 (FIG. 8). In addition, the target state calculation section 24 calculates the state of the target using the estimated target length.

If the target state calculation section 24 can calculate the target length based on data acquired from the millimeter-wave sensor 12 and the image sensor 14 after step S10 is executed (YES at step S12a), the target state calculation section 24 calculates the state of the target referring to the data acquired from the millimeter-wave sensor 12 and the image sensor 14 (step S12b).

If the target state calculation section 24 has estimated the target length (step S12c), the collision avoidance control section 28 sets the first deceleration as the predetermined deceleration (step S14). On other hand, if the target state calculation section 24 has calculated the target length (step S12b), the collision avoidance control section 28 executes a setting deceleration process (step S15) illustrated in FIG. 10.

First, the collision avoidance control section 28 determines whether the target length has been estimated in the previous collision avoidance process (step S15a). If the collision avoidance control section 28 has determined that the target length has not been estimated (NO at step S15a), the collision avoidance control section 28 sets the first deceleration as the predetermined deceleration (step S15d). If the collision avoidance control section 28 has determined that the target length has been estimated (YES at step S15a), the collision avoidance control section 28 determines whether the target length calculated in the step S12b is longer than the target length estimated in the last step S12c (step S15b). If the collision avoidance control section 28 has determined that the calculated target length is longer than the estimated target length (YES at step S15b), the collision avoidance control section 28 sets the second deceleration as the predetermined deceleration (step S15c). If the collision avoidance control section 28 has determined that the calculated target length is not longer than the estimated target length (NO at step S15b), the collision avoidance control section 28 sets the first deceleration as the predetermined deceleration (step S15d). It is noted that, if a result of the determination in step S15 is NO, step S15c may be executed instead of step S15d.

As described above, if the target state calculation section 24 has estimated the target length, the collision avoidance control section 28 sets the first deceleration as the predetermined deceleration (step S12c). When the target state calculation section 24 has calculated the target length after the target state calculation section 24 has estimated the target length and when the calculated target length is longer than the estimated target length, the collision avoidance control section 28 sets the second deceleration as the predetermined deceleration which is greater than the first deceleration (step S15c). According to the third embodiment, the following advantageous effects can be obtained in addition to the effects of the first embodiment. The collision avoidance system 10 is capable of reducing the probability of the own vehicle 30 colliding with the target by the collision avoidance process in the present embodiment described in detail above.

D. Fourth Embodiment

Figure 11:
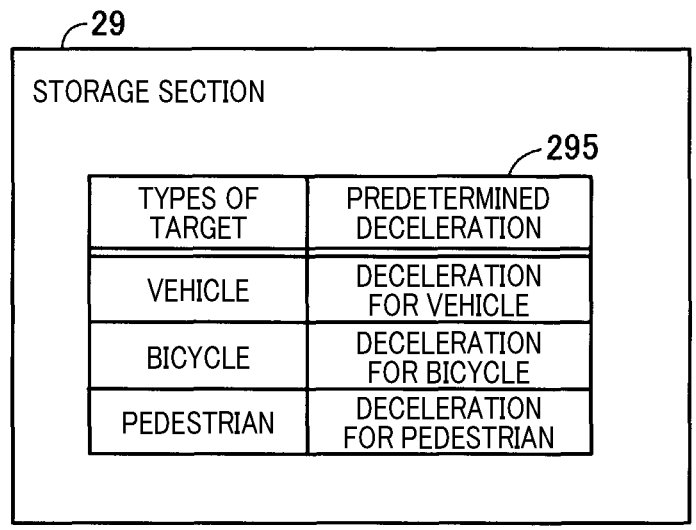
FIG. 11 is a block diagram of a storage section in a fourth embodiment.
Figure 12:
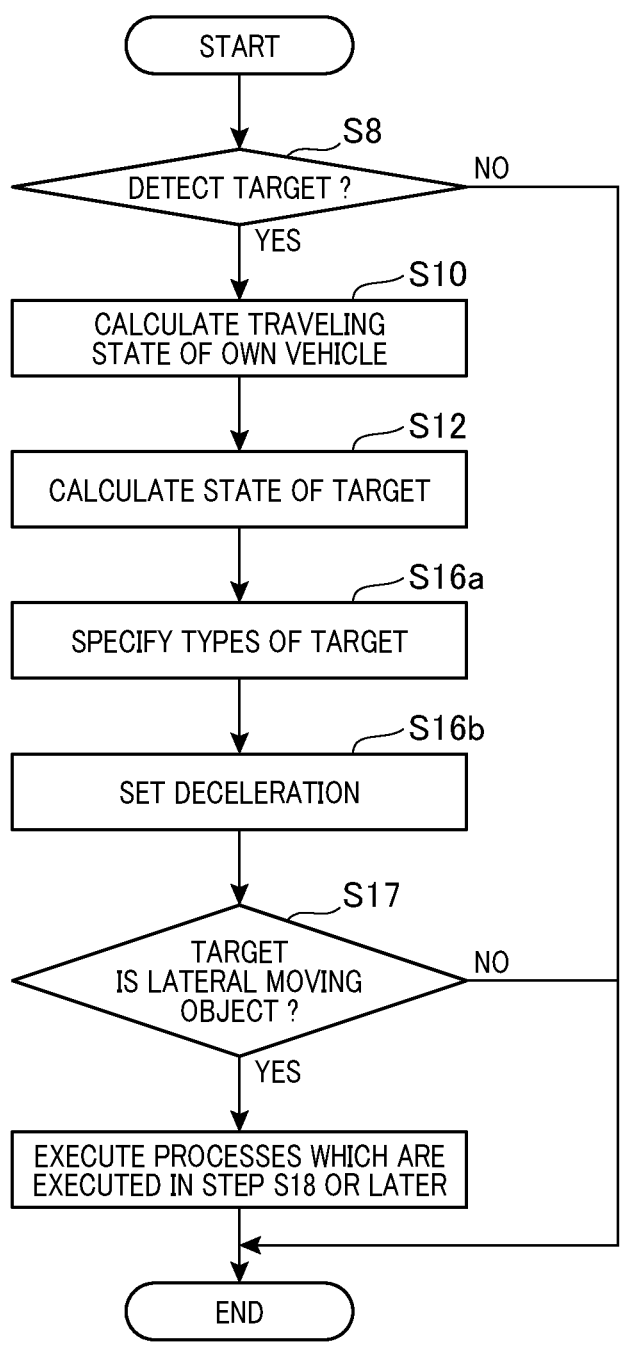
FIG. 12 is a flowchart of a collision avoidance process in the fourth embodiment.

Referring to FIGS. 11 and 12, below is a description of a collision avoidance process in the fourth embodiment which is implemented by the collision avoidance system 10. The collision avoidance process in the fourth embodiment is different from that according to the first embodiment in additional steps S16a and S16b in the collision avoidance process. Except for steps S16a and S16b, steps in the fourth embodiment are the same as in the first embodiment. Accordingly, the following description deals with the process different from those of the first embodiment. Identical processes are denoted by the same reference signs as the first embodiment, and the description thereof is omitted.

As shown in FIG. 11, the storage section 29 in the ECU 20 stores a setting table 295 instead of the deceleration 290. The setting table 295 defines a relationship between the types of target (vehicle, bicycle, pedestrian) and the predetermined deceleration used by the collision avoidance control section 28. If the type of target is a vehicle, the collision avoidance control section 28 sets a deceleration for the vehicle as the predetermined deceleration used by the brakes 40. If the type of target is a bicycle, the collision avoidance control section 28 sets a deceleration for the bicycle as the predetermined deceleration used by the brakes. If the type of target is a pedestrian, the collision avoidance control section 28 sets a deceleration for the pedestrian as the predetermined deceleration used by the brakes. Among the three decelerations described above, the deceleration for the vehicle is the greatest deceleration, and the deceleration for the pedestrian is the lowest deceleration. For example, the deceleration for the vehicle is set to −8 (m/s$^2$). The deceleration for the bicycle is set to −6 (m/s$^2$). The deceleration for the pedestrian is set to −4 (m/s$^2$).

As shown in FIG. 12, next step S12, the target state calculation section 24 integrates data have acquired from the millimeter-wave sensor 12 and the image sensor 14 to create a fusion data. Then, the target state calculation section 24 specifies the types of target by referring to the fusion data (step S16a). The collision avoidance control section 28 sets the deceleration referring to the specified types of target in step S11a and the setting table 295 (step S16b). The set deceleration is used for calculation of the operation timing Tbs and the operation period Tbt in step S24 and control of the brakes 40 in the collision avoidance process. It is noted that, the processes of step S16a and S16b may be executed before step 24 in which the operation timing Tbs and the operation period Tbt are calculated.

As described above, in the collision avoidance process in the third embodiment, the collision avoidance control section 28 changes the predetermined deceleration in accordance with the types of target (step S16a). Therefore, according to the third embodiment, the following advantageous effects can be obtained in addition to the effects of the first embodiment. The collision avoidance control section 28 changes the predetermined deceleration in accordance with the types of target. Due to this, it is capable of executing the collision avoidance process by deceleration in accordance with the types of target. For example, among the vehicle, the bicycle and the pedestrian in the types of target, it is generally assumed that a moving velocity of the vehicle is the greatest moving velocity and a moving velocity of the pedestrian is the lowest moving velocity. Accordingly, it is capable of setting the deceleration greater as the assumed moving velocity being greater.

E. Modifications

E-1. First Modification

Figure 13:
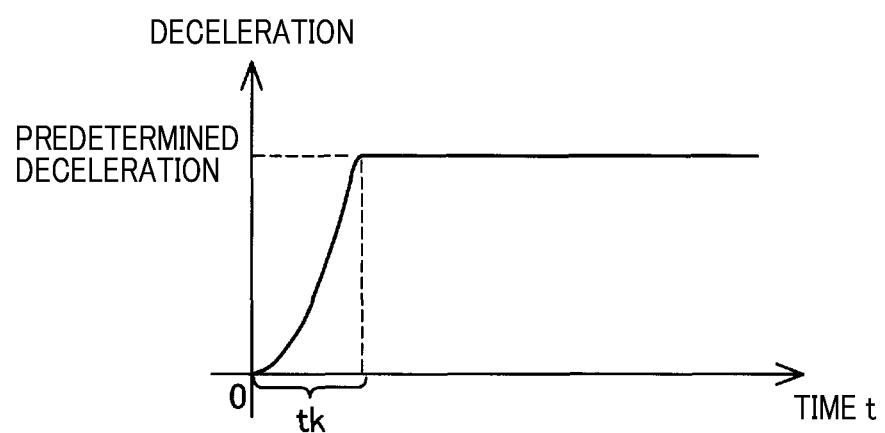
FIG. 13 is a diagram illustrating a relationship between a predetermined deceleration and time.

In each of embodiments described above, the collision avoidance control section 28 calculates the predetermined deceleration using the operation timing Tbs of the brakes 40 and the operation period Tbt of the brakes 40. However, the collision avoidance control section 28 may calculate the operation timing Tbs and the operation period Tbt based on jerk (deceleration) which is generated until the velocity of the own vehicle 30 reaches the predetermined deceleration. As shown in FIG. 13, it is required to have a predetermined period (hereinafter referred to as a set reaching time tk between a time when the brakes 40 are operated and a time when the velocity of the own vehicle 30 becomes the predetermined deceleration, being caused by the jerk. The predetermined period is depending on types and performances of the brakes 40. Therefore, if the collision avoidance control section 28 calculates the jerk, the collision avoidance control section 28 may calculate the operation timing Tbs of the brakes 40 such that the operation period Tbt of the brake 40 is longer than the operation period Tbt of the brakes 40 when the collision avoidance control section 28 calculates no jerk. That is, the collision avoidance control section 28 corrects the operation timing Tbs calculated by using the equations (1) to (3) such that the operation period Tbt when the collision avoidance control section 28 calculates the jerk, is longer than the operation period Tbt when the collision avoidance control section 28 calculates no jerk. In other words, the collision avoidance control section 28 calculates the corrected operation timing Tbs by adding a positive corrected value to the operation timing calculated by using the equations (1) to (3). The positive corrected value may be, for example, the set reaching time tk or a value which is less than a value of the set reaching time tk. With the first modification, it is capable of better setting a suitable value to the operation timing Tbs of the brakes 40 in order to avoid the collision between the own vehicle 30 and the lateral moving object 35.

E-2. Second Modification

In the third embodiment, the target length is estimated based on intensity of the millimeter-wave sensor, however, an estimation of the target length is not limited to those estimation methods. For example, reflected waves from the front wheels and rear wheels of the vehicle are detected, and the target length may be estimated based on positions of the reflected waves of the front wheels and the rear wheels of the vehicle. Specifically, a distance between the front wheels and the rear wheels of the vehicle may be calculated by using the reflected waves, and the target length may be estimated by adding a compensation value (for example, from 1.0 m to 2.0 m) to the calculated distance between the front wheels and the rear wheels of the vehicle.

E-3. Third Modification

The collision avoidance process may be executed by combination of two or more embodiments in the first to fourth embodiments. For example, the collision avoidance process may be executed by combination of the second embodiment and the fourth embodiment. The collision avoidance process may be executed by combination of the third embodiment and the fourth embodiment.

E-4. Fourth Modification

In the above embodiments, the collision avoidance control section 28 calculates the operation timing Tbs such that the passing-through period Ttb of the lateral moving object is the same period as the reaching period Tca of the own vehicle. However, the calculation of the operation timing Tbs by the collision avoidance control section 28 is not limited to those calculation methods. The operation timing Tbs may be calculated within a range in which the brakes 40 are operated at a suitable timing. For example, the collision avoidance control section 28 may add a positive compensation value to the passing-through period Ttb of the lateral moving object. Then, the collision avoidance control section 28 may calculate the operation timing such that the compensated passing-through period Ttb of the lateral moving object is the same as the reaching period Tca of the own vehicle. The positive compensation value may be a value which makes it possible for the lateral moving object 35 to more safely pass through the own vehicle course 32 before the own vehicle 30 reaches the lateral moving object course 37. For example, the positive compensation value may be a value in which any one of the distances from 0.3 m to 1.5 m is divided by a moving velocity of the lateral moving object.

E-5. Fifth Modification

The collision avoidance processes of the above embodiments including the processes of step S28 and step S30, however, may omit execution of the processes of step S28 and step S30. That is, the collision avoidance control section 28 may execute the process of step S32 after the process of step S26 without executing the process of step S28. The collision avoidance control section 28 thus calculates the operation timing Tbs of the brakes 40 based on the passing-through period Ttb of the lateral moving object and the reaching period Tca of the own vehicle. Then, the collision avoidance control section 28 automatically operates the brakes 40 at the calculated operation timing Tbs. Therefore, it is capable of suppressing that the brakes from being automatically operated at an unduly early timing and instead operating the brakes at an appropriate timing.

The present disclosure can be implemented in various aspects other than the collision avoidance apparatus. For example, the present disclosure can be achieved in aspects such as a program for executing a control method of the collision avoidance apparatus and a vehicle including the collision avoidance apparatus.

The present disclosure should not be construed as being limited embodiments, examples and modifications described above, but may be implemented various forms/aspects/modes in the technical scope not departing from the scope of the disclosure. For example, embodiments according to the technical features of each of embodiments described in Summary of the Invention, examples and the technical features of modifications may be appropriately replaced or be combined, in order to overcome technical problems described above. Furthermore, if the technical features are not described as being necessary in the specification, the technical features may be appropriately omitted.

What is claimed is:

1. A collision avoidance apparatus comprising:
a traveling state calculation section configured to calculate a traveling state which includes a moving direction and a moving velocity of an own vehicle;
a target detection section configured to detect a target ahead of the own vehicle;
a target state calculation section configured to calculate a state of the target detected by the target detection section which includes a moving direction of the target, a size of the target, a moving velocity of the target, and a position of the target relative to a position of the own vehicle;
a lateral moving object determination section configured to determine whether the target is a lateral moving object moving in a direction orthogonal to the moving direction of the own vehicle;
a collision determination section configured to determine whether the own vehicle will collide with the lateral moving object when the lateral moving object determination section has determined that the target is the lateral moving object; and
a collision avoidance control section configured to automatically control brakes of the own vehicle such that a velocity of the own vehicle is to be a predetermined deceleration when the collision determination section has determined that the own vehicle will collide with the lateral moving object,
wherein the collision determination section is configured to:
calculate a passing-through period of the lateral moving object, which is a period elapsing from a present time to a time in which a rear end of the lateral moving object passes through an own vehicle course, which is a moving course of the own vehicle;
calculate a reaching period of the own vehicle, which is a period elapsing from the present time to a time in which the own vehicle reaches a lateral moving object course, which is a moving course of the lateral moving object;
calculate a reaching period of the lateral moving object, which is a period elapsing from the present time to a time in which the lateral moving object reaches the own vehicle course;
calculate a passing-through period of the own vehicle, which is a period elapsing from the present time to a time in which the own vehicle passes through the lateral moving object course;
determine whether the passing-through period of the own vehicle is less than or equal to the reaching period of the lateral moving object;

determine whether the passing-through period of the lateral moving object is less than or equal to the reaching period of the own vehicle; and in response to determining that both (i) the passing-through period of the own vehicle is not less than or equal to the reaching period of the lateral moving object, and (ii) the passing-through period of the lateral moving object is not less than or equal to the reaching period of the own vehicle, calculate an operation timing of the brakes of the own vehicle to avoid collision with the lateral moving object, wherein the brakes of the own vehicle are operated at the operation timing.

2. The collision avoidance apparatus according to claim 1, wherein the collision avoidance control section calculates the operation timing of the brakes such that the passing-through period of the lateral moving object is the same as the reaching period of the own vehicle.

3. The collision avoidance apparatus according to claim 2, wherein the collision avoidance control section is configured to:

calculate an own vehicle stop period that is a period from when the collision avoidance control section operates brakes to when the own vehicle stops, when the brakes are operated at the time when the collision determination section determines that the own vehicle will collide with the lateral moving object; and when the collision avoidance control section has determined an operation period of the brakes is longer than the own vehicle stop period, operate the brakes at a stop time regardless of whether the operation timing of the brakes arrives, the operation period of the brakes being a period from when the brakes at the operation timing of the brakes to when operation of the brakes is terminated, the stop time being a time at which the own vehicle is capable of stopping in a front of the lateral moving course.

4. The collision avoidance apparatus according to claim 1, wherein for a state in which the collision avoidance control section has determined a calculation disabled state in which the target state calculation section cannot calculate the state of the target, the collision avoidance control section operates the brakes from when the collision avoidance control section determines the calculation disabled state regardless of whether the operation timing of the brakes has arrived.

5. The collision avoidance apparatus according to claim 1, wherein when the target state calculation section cannot calculate a target length along the moving direction of the target, the target state calculation section estimates the target length along the moving direction of the target based on reflected waves acquired from a millimeter-wave sensor mounted on the own vehicle and calculates the state of the target.

6. The collision avoidance apparatus according to claim 5, wherein the estimated target length decreases with decreasing reflection intensity of the reflected waves.

7. The collision avoidance apparatus according to claim 5, wherein the collision avoidance control section is configured to:

set a first deceleration as the predetermined deceleration when the target state calculation section has estimated the target length; and set a second deceleration as the predetermined deceleration when the target state calculation section has calculated the target length after the target state calculation section has estimated the target length and the calculated target length is longer than the estimated target length, the second deceleration being greater than the first deceleration.

8. The collision avoidance apparatus according to claim 1, wherein the collision avoidance control section calculates jerk of a period between a time when the brakes are operated and when the speed of the own vehicle is to be the predetermined deceleration, and calculates the operation timing of the brakes such that an operation period of the brakes is longer than an operation period of the brakes when no jerk is calculated.

9. The collision avoidance apparatus according to claim 1, wherein the collision avoidance control section changes the predetermined deceleration in accordance with types of the target.

10. The collision avoidance apparatus according to claim 9, wherein:

the types of target include a vehicle, a bicycle and a pedestrian; and among the vehicle, the bicycle and the pedestrian, the collision avoidance control section sets to a greatest value as the predetermined deceleration when the target is the vehicle, and sets to a lowest value as the predetermined deceleration when the target is the pedestrian.

11. The collision avoidance apparatus according to claim 1, wherein a width of the own vehicle course is defined in the direction orthogonal to the moving direction by a width of the own vehicle, and a width of the lateral moving object course is defined in a direction parallel to the moving direction by a width of the target.

12. The collision avoidance apparatus according to claim 1, wherein:

the collision avoidance control section is configured to:

calculate an operation period of the brake in accordance with a predetermined first correlation among (i) the passing-through period of the own vehicle, (ii) the reaching period of the lateral moving object, and (iii) the operation period of the brakes; and calculate the operation timing of the brakes in accordance with a predetermined second correlation among the calculated operation period of the brakes and the operation timing of the brakes.

\* \* \* \* \*